United States Patent Office 2,798,800
Patented July 9, 1957

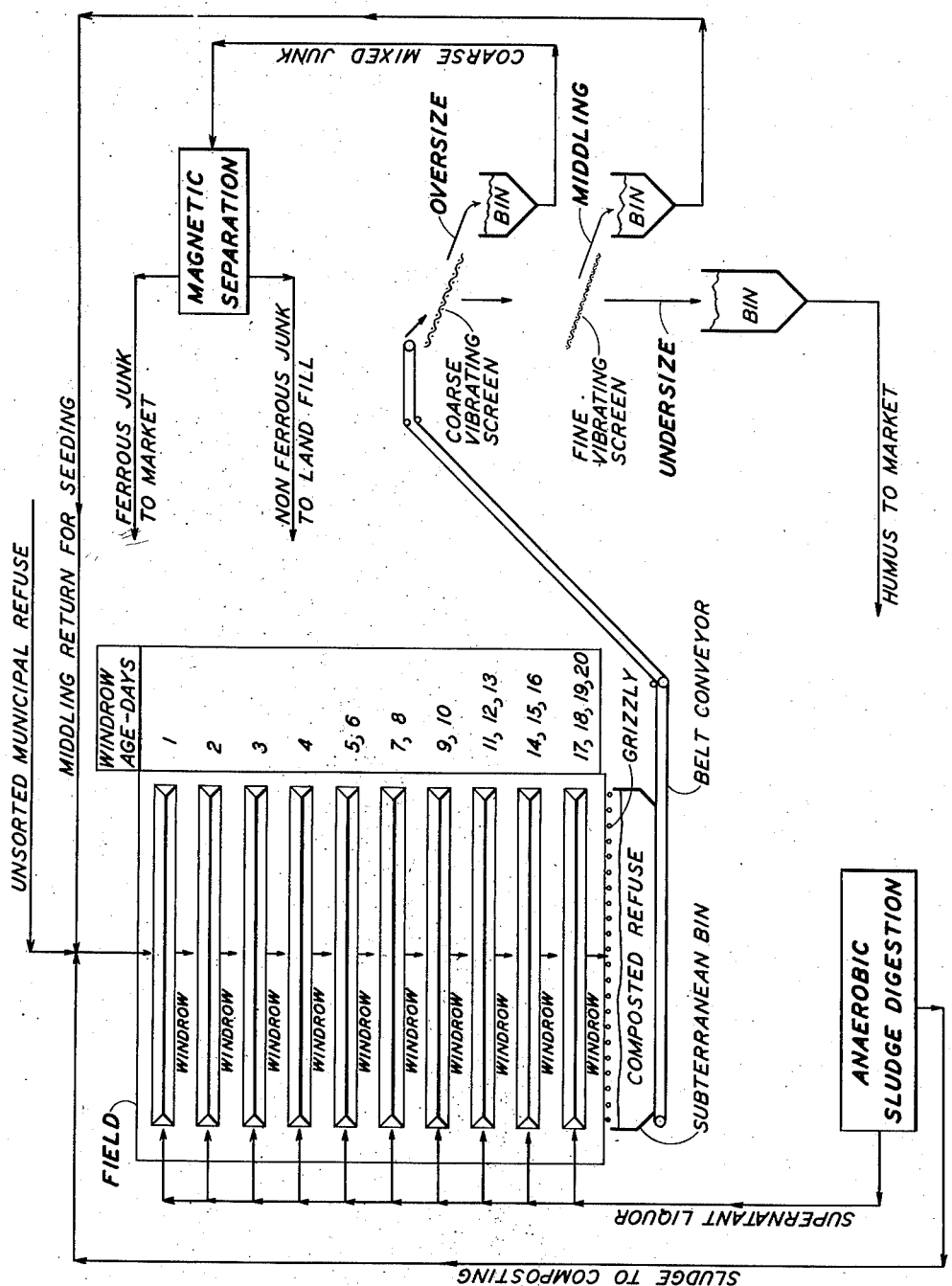

2,798,800

PROCESS OF COMPOSTING MUNICIPAL REFUSE IN WINDROWS

Cecil J. Geraghty, Redwood City, and Richard R. Kennedy, Palo Alto, Calif., and Chancy S. Seabrook, Tacoma, Wash., assignors to Modoc Peat Moss Company, San Francisco, Calif., a corporation Application March 1, 1954, Serial No. 413,174

3 Claims. (Cl. 71—9)

This invention is concerned with composting, and particularly with the application of composting to unsegregated solid municipal refuse of the types collected in most urban communities throughout the United States. It provides an improved process whereby the solid organic content (garbage) of municipal refuse is converted rapidly and reliably into a valuable soil additive (humus) without preliminary segregation of the inorganic content (junk) and without grinding equipment. In fact, the only equipment required for the process is a bulldozer or power shovel and a screen. Both operating cost and capital investment for the process are small and, even when the sale price of the humus produced is very low, application of the process may show a substantial profit.

The city dump is at once an eyesore, a smoke and odor nuisance, a health hazard and an economic waste. Modern incinerator plants eliminate the eyesore, the nuisance and the health hazard, but they are expensive to build and operate, consume large quantities of fuel, and burn up organic matter which should be returned to the soil. Disposal of municipal waste by land fill operations is usually as satisfactory as incineration and generally cheaper, provided that the refuse is properly levelled and covered and provided further that the large areas of land required are not too far distant from the refuse source; but the humus which eventually forms in such fills is not readily available for agriculture, and will probably be recovered, if at all, only after several generations and then only when the local need for humus justifies an extensive mining operation.

Composting involves the conversion of solid organic material to humus through the action of microorganisms. It has been employed in Europe in a number of instances to convert municipal garbage into marketable humus, but under economic conditions very different from those in the United States. In Europe, due to the great age and extensive cultivation of agricultural lands and the relative scarcity and high price of chemical fertilizers, humus commands a relatively high price, whereas in the United States it must compete in general with low priced materials such as peat, stable manure and top soil. Moreover, European wage scales are relatively low, so that hand sorting may be employed to separate refuse into such saleable components as scrap metal, old bottles, and waste paper, which is difficult to compost, leaving a garbage balance which is relatively easy to compost. Consequently, European economic conditions frequently justify elaborate plants and extensive labor for sorting junk out of municipal refuse and grinding and composting the remaining garbage. But examples of similar successful practices in the United States are singularly lacking, despite many prior attempts and proposals.

In Technical Bulletin No. 9, Series 37, published in June 1953 by the Sanitary Engineering Project, University of California, Berkeley, the history of the reclamation of municipal refuse by composting throughout the world is reviewed in detail and the results of a series of laboratory and field scale tests are reported. The Bulletin points out the need for humus such as might be produced from municipal refuse, discusses reasons why many foreign composting methods are not applicable in the United States, and examines the factors which have inhibited the adoption of composting as a method for the reclamation of humus from municipal refuse in this country. On the basis of the tests reported, the Bulletin states that municipal refuse is extremely abrasive; that the special equipment for grinding it has not been developed in the United States, that grinding is necessary to rapid aerobic composting; that removal of tin cans, miscellaneous metals, glass and ceramics, rocks, etc., is a prerequisite to the grinding; and that regrinding of the finished compost is highly desirable. The Bulletin concludes that "the fundamental steps of a rapid, aesthetically acceptable, reliable and economic method of composting include segregation, grinding, stacking, turning and regrinding."

Our own investigations indicate that the costs of segregation, grinding and regrinding are so high in the United States that the process postulated above is likely to be uneconomic except in scattered instances where labor costs are low and there is a large local demand for humus at a high price. But we have developed a process by which satisfactory humus can be produced rapidly by aerobic composting of municipal refuse without employing any of these three expensive steps.

In essence, the process of our invention contemplates the stacking of unsegregated municipal refuse in a windrow (the term windrow being employed in this specification and the appended claims to mean an elongated, unconfined pile approximately triangular in a section taken perpendicular to its longitudinal axis, the sides of the pile being permitted to assume the natural angle of repose for the material of the pile), assuring that the windrow retains a suitable moisture content (say 40% to 60%), tumbling the windrow every few days, preferably by means of a bulldozer and blade which moves the windrow laterally a distance about equal to its width and restores it to its original height, and repeating this tumbling operation until the garbage content of the waste has been substantially composted and converted to humus. This usually takes three to eight weeks. Thereafter, the still unsegregated mixture of junk and humus is simply screened, the oversize being rejected and the undersize being a finished humus product.

The optimum height of the windrow will depend upon the nature of the refuse, the object being to make the windrow high enough that it will retain adequate heat for the growth of aerobic microorganisms and not so high that it will compact to the point where anaerobic zones are formed. In general we have found that a height from five feet to eight feet is satisfactory. The refuse is permitted to assume its angle of repose in the windrow and a pile eight feet high will be about 20 feet wide at the base and roughly triangular in cross section.

The frequency of tumbling will depend upon the rapidity with which the composting proceeds, and this in turn depends upon the microorganisms present, the porosity of the pile, and the ratio of carbon to nitrogen in the garbage. Generally, the windrow should be tumbled every two or three days. In any event, the windrow should be tumbled whenever available oxygen within it is reduced to such an extent that it will not support vigorous aerobic action.

If the operation is properly conducted, the interior of the windrow will rapidly attain a temperature in the range of 140° to 160° F., and will retain this temperature until it is tumbled, after which the temperature will rapidly return to the range.

The junk such as scrap metal, bottles, ceramics and rocks act as grinding media when the refuse is tumbled, so that as composting proceeds the garbage is abraded and reduced in particle size. The junk also adds to the bulk and increases porosity, making it easier for air to penetrate the windrow. Probably because of the presence of the junk, the bulldozer may be run up onto the windrow during the tumbling operation without compacting it unduly, but such compacting as does occur aids the grinding action of the junk and the action of the microorganisms in bringing about the comminution of the solid organic material.

As composting proceeds, the density of the material increases. In one instance the initial refuse weighed 350 lbs. per cubic yard, and this was increased to 1300–1400 lbs. per cubic yard at the end of the composting operation. This increase in density is, of course, accompanied by a shrinkage in volume. To compensate for such shrinkage it is desirable to form a series of windrows side by side from the collections made on successive days and to combine adjacent windrows of nearly the same age in the latter stages of the process, so as to maintain approximately the same windrow height throughout.

Municipal garbage in the United States is characterized by a high proportion of waste paper and cardboard. Such material is nearly pure cellulose, does not have a nitrogen content sufficient to support life processes of the aerobic microorganisms which bring about composting, and has generally been considered as very difficult to decompose by composting. Nevertheless, we have found that such material composts readily in our process, and appears to be no more refractory than cabbage leaves and the like. The finished compost contains no paper that is distinguishable as such, except for a few fragments of wax paper and cellophane.

Composting proceeds more rapidly as the carbon-nitrogen ratio is reduced. Most municipal garbage has a C/N ratio in the range of 50 to 1, to 25 to 1, and this is high enough to bring about substantially complete composting by our process in from three to eight weeks. However, if the C/N ratio is too high or if composting is to be accelerated, the C/N ratio may be reduced by the addition of nitrogen. We have found that an excellent additive is the supernatant liquor from anaerobic digestion of sewage, sludge. This liquor is difficult to dispose of in sewage treatment operations, and may foul the sewage treatment process if it is returned to it. Consequently, the use of the supernatant liquor in our composting process confers a four-fold benefit, viz:

1. The liquor is a good source of the moisture necessary for proper aerobic composting;
2. The nitrogen content of the liquor accelerates composting;
3. The nitrogen content of the liquor is in part recovered in the humus produced; and
4. A difficult disposal problem in the sewage treatment plant is alleviated to the extent that the liquor is used in the composting.

We have found that sewage sludge as well as supernatant liquors may be added to the windrows with beneficial results. The sludge may contain microorganisms which act as inoculum and also contains a relatively high proportion of useful carbon even through its nitrogen content usually is low.

There is no need to employ special cultures of microorganisms as inoculum to initiate the composting. Municipal garbage usually contains organisms which make composting "self starting." When it does not, rapid composting action can be initiated with sewage sludge or by the return of a small proportion of finished humus.

Maintenance of proper moisture content in the windrows throughout the operation is important. If the moisture content rises much above 60%, the piles become anaerobic and putrescence sets in with the production of disagreeable odors, at the same time the rate of composting drops sharply. If the moisture content drops much below 40%, the aerobic microorganisms lack sufficient moisture for vigorous life processes.

The process of the invention will be completely understood in the light of the following detailed description of a presently preferred practice thereof designed for handling municipal refuse collected from a city of 144,000 people in the Pacific Northwest. The figures given are based on those obtained in an experimental or pilot operation in which approximately one fifth of the refuse produced by the city was treated. The process is illustrated by the accompanying single figure which is a flow sheet or diagram of the operation.

From the city there is collected annually about 162,000 cubic yards of unsorted refuse and about 47,800 cubic yards of waste paper. The municipal sewage plant annually produces about 2500 cubic yards of digester sludge. All of this material is trucked to the composting operation and combined.

From the flow sheet it will be seen that the composting is carried out in the open on a flat rectangular field about 600 feet wide by 1000 feet long. Each day's collection of refuse and waste paper is trucked to the site and dumped in a long windrow at the far end of the field, successive days being represented initially by separate windrows side by side. The day's make of digester sludge (having a C/N ratio in the range of 50/1 to 70/1) is also dumped along the windrow, which is about 20 feet at the base and about eight feet high. A bulldozer is employed to dress up the original windrow, and this accomplishes tumbling and mixing of its various constituents. About twice a week each day's windrow is bulldozed toward the near end of the field. The bulldozer with its blade pushes approximately at right angles to the major axis of the windrow, and the windrow is moved laterally a distance about equal to its width at the base, or say 20 feet and reformed to its original cross section. Composting takes about 20 days and the bulk of the refuse decreases as composting proceeds, so that after about four or five days two windrows can be combined to form one of about the original size. After about ten days composting has proceeded to the point where a single consolidated windrow contains about three days supply of refuse and after about 17 days the refuse has shrunk so that as much as four days supply of refuse may be included in a single windrow.

All of the windrows are kept in a moisture range of 40%–60% by the addition of supernatant liquor from the anaerobic sludge digestion operation. This supplies considerable nitrogen to the refuse as food for the microorganisms, and also increases the nitrogen content of the final compost, this having a C/N ratio of about 20/1.

Each time the windrows are moved and combined by the bulldozing action they are restored approximately to the original triangular cross section and to the same height and width.

During the composting operation the temperature at the interior of the windrows ranges from about 140° to 160° F., even in cool weather. This temperature is high enough to pasteurize the material and to kill fly larvae so that with reasonable precautions there is no likelihood of either fly or rodent nuisance. Even in hot weather there is no odor nuisance and the final compost has only a slightly musty odor.

After an operation of the foregoing type has been started with, say, ten windrows including the refuse collected in 20 days, it is desirable to combine fresh refuse in windrows which have already been composted for a few days. For example, the refuse collected on the 21st day may be combined in a windrow of refuse which is three days old, the tumbling operation being conducted so that most of the fresh refuse is covered by the older material. This accelerates the composting action and also reduces the likelihood of odor nuisance.

After the composting in the oldest windrow is substantially completed, say at the end of the 20th day, the oldest windrow is pushed laterally by the bulldozer over a stationary bar screen or grizzly disposed at field level and having approximately six inch openings. Everything except an occasional large piece of junk which has survived comminution by the bulldozer falls through the grizzly into a subterranean bin which runs across the near end of the field. From the bin, the composted unsegregated refuse is carried by a belt conveyor to a screening plant provided with an upper shaker screen of coarse mesh, say with two inch or one and one-half inch openings, and a lower shaker screen of fine mesh, say with one inch to ⅜ inch openings, in series. Both screens have a slope of about 20°.

The oversize from the coarse screen is stored temporarily in a bin and thereafter subjected to conventional magnetic separation to remove scrap iron and other ferrous junk, which is marketed. The balance of the coarse junk is principally non-metallic and worthless. It is disposed of in land filling operations.

The material which falls through the coarse screen is dropped onto the fine screen. Only a small amount of material is retained on the fine screen, about 95% of this being gravel introduced into the windrows from the ground during the turning operations with the bulldozer. A small proportion of coarse compost accompanies the gravel as oversize on the fine screen and this middling material is stored temporarily in a bin and returned by truck to a windrow undergoing formation. Sufficient microorganisms are present in the middling to "seed" the fresh refuse and start rapid composting.

The material passing through the fine screen is a finished humus or compost. This contains a small proportion of very fine splinters of glass. The glass, however, is so fine that it does not cut the hand when a handful of the humus is squeezed. The final humus is loose and fluffy and cannot be puddled (i. e. squeezed into a compact mass) as can a handful of clay or ordinary soil. It is dark brown or dark grey in color and has the appearance of finely crushed leaf mold.

In the operation described above approximately 35% of the total composted refuse is retained on the coarse screen, about 1% is retained on the fine screen and the balance or approximately 53% is the humus product.

The total material subjected to the composting operation in a year is approximately 212,000 cubic yards from which the humus product is approximately 34,500 cubic yards. The coarse non-metallic junk which is disposed of by land fill amounts to about 24,000 cubic yards or only about 11% of the bulk of the original refuse. In the land filling operation it is compacted to a still smaller volume, say 5% of that of the original refuse. This represents a substantial economy over the prior practice in which the entire bulk of refuse was disposed of by land fill.

The amount of ferrous scrap recovered varies considerably but may amount to several hundred tons a year. It is clean, though rusty and finds a local market for the recovery of copper from dilute solutions by cementation.

The fine screen need not have a mesh as fine as ⅜ inch, because experience indicates that 90% of the material which passes a ⅝ inch screen will likewise pass a ¼ inch screen. In other words, the particle size of the finished compost is relatively small while that of the uncomposted junk is quite large and a satisfactory humus product can be produced with a single screen of say 1 or 1½ inch mesh.

Spot analyses of the final compost product after screening indicates that it contains about 15%–25% moisture, and (on a dry basis) the following other constituents

|  | Percent |
|---|---|
| N | about 1 |
| P as $P_2O_5$ | about 1 |
| K as $K_2O$ | about .8 |
| C | about 19 |

The relatively high percentage of paper in the refuse produced no problem in composting.

In addition to the bins, the conveyor and the shaking screens, the foregoing operation requires two bulldozers, three dump trucks and one pick up truck, plus a pipeline for conveying supernatant liquor from the sewage treatment plant through the windrows during dry weather. If desired, a tank truck may be employed to haul the supernatant liquor and thus replace the pipeline.

The personnel for the foregoing operation includes one foreman, two bulldozer operators, four truck drivers, one mechanic and oiler, and a laborer. The operation is conducted on only one shift.

The humus produced is competitive in the local market with materials such as peat, good top soil, and cow manure at a price of about $3.00 per cubic yard.

We claim:

1. In the treatment of municipal refuse containing garbage together with substantial proportions of inorganic junk and waste paper products, the improvement which comprises forming the unsegregated uncomminuted refuse containing the junk and the paper products into an elongated windrow disposed in a field and having a height ranging from about 5 to about 8 feet and a width determined by the angle of repose of the refuse, maintaining in the windrow a moisture content ranging from about 40% by weight to about 60% by weight, tumbling the windrow and at the same time moving it laterally and reforming it repeatedly on the field at intervals of several days while permitting the interior of the windrow to rise to a temperature in the range of about 140° F. to about 160° F. between tumblings, continuing the tumbling and reforming operation until substantially all of the garbage and paper products are composted to humus, and thereafter separating the uncomposted junk from the humus by screening.

2. In the treatment of municipal refuse containing garbage together with substantial proportions of inorganic junk and waste paper products, the improvement which comprises forming the unsegregated uncomminuted refuse containing the junk and the paper products into an elongated windrow disposed in a field and having a height ranging from about 5 to about 8 feet and a width determined by the angle of repose of the refuse, maintaining in the windrow a moisture content ranging from about 40% by weight to about 60% by weight by wetting the refuse with supernatant liquor from anaerobic sludge digestion, tumbling the windrow and at the same time moving it laterally and reforming it repeatedly on the field at intervals of several days while permitting the interior of the windrow to rise to a temperature in the range of about 140° F. to about 160° F. between tumblings, continuing the tumbling and reforming operation until substantially all of the garbage and paper products are composted to humus, and thereafter separating the uncomposted junk from the humus by screening.

3. In the treatment of municipal refuse containing garbage together with substantial proportions of inorganic junk and waste paper products, the improvement which comprises forming the unsegregated uncomminuted refuse containing the junk and the paper products into successively older elongated windrows disposed side by side in a field and having heights ranging from about 5 to about 8 feet and widths determined by the angle of repose of the refuse, maintaining in the windrows a moisture content ranging from about 40% by weight to about 60% by weight, tumbling the windrows and at the same time moving them laterally and reforming them repeatedly on the field after intervals of at least one day while permitting the interior of the windrow to rise to a temperature in the range of about 140° F. to about 160° F. between tumblings, combining adjacent windrows by moving them together laterally to form a single one about 5 to about 8 feet high after composting has brought about substantial shrinkage of the volumes of the adjacent windrows, continuing the tumbling and reforming operations until substantially all of the garbage and paper products are composted to humus, and thereafter separating the uncomposted junk from the humus by screening.

References Cited in the file of this patent

UNITED STATES PATENTS

| | | |
|---|---|---|
| 1,260,103 | Wallace | Mar. 19, 1918 |
| 1,471,979 | Richards et al. | Oct. 23, 1923 |
| 1,617,014 | Derleth | Feb. 8, 1927 |
| 2,043,265 | Roeder | June 9, 1936 |
| 2,535,627 | Earp-Thomas | Dec. 26, 1950 |
| 2,604,207 | Scott | July 22, 1952 |

OTHER REFERENCES

The Garden Dictionary, Houghton Mifflin Co., 1938, Composting, page 165.

Garden Encyclopedia, Wise and Co., 1936, pages 296–297.

Organic Gardening, vol. 20, No. 8, August 1952, "City With Golden Garbage," by A. W. Martinez; published by Rodale Press, 6th and Minor Streets, Emmaus, Pa.